(12) United States Patent
Kato et al.

(10) Patent No.: US 8,272,161 B1
(45) Date of Patent: Sep. 25, 2012

(54) DEEP ROOT WATERING SYSTEM

(75) Inventors: Michael K. Kato, Yorba Linda, CA (US); Roger K. Kobata, Cerritos, CA (US)

(73) Assignee: Water Sock Root Watering System, LLC, Fountain Valley, CA (US)

( * ) Notice: Subject to any disclaimer, the term of this patent is extended or adjusted under 35 U.S.C. 154(b) by 0 days.

(21) Appl. No.: 12/835,723

(22) Filed: Jul. 13, 2010

(51) Int. Cl.
*A01G 29/00* (2006.01)

(52) U.S. Cl. ............................................. 47/48.5

(58) Field of Classification Search ............ 47/48.5, 47/79, 80
See application file for complete search history.

(56) References Cited

U.S. PATENT DOCUMENTS

| | | | | | |
|---|---|---|---|---|---|
| 1,971,390 | A | * | 8/1934 | Van Yahres | 47/48.5 |
| 2,380,721 | A | * | 7/1945 | Brigden | 47/48.5 |
| 2,931,140 | A | * | 4/1960 | Laffier et al. | 47/48.5 |
| 3,188,771 | A | * | 6/1965 | Ballai | 47/47 |
| 3,460,562 | A | * | 8/1969 | Moulder | 137/268 |
| 3,845,902 | A | * | 11/1974 | Delamater | 239/314 |
| 4,941,282 | A | * | 7/1990 | Milstein | 47/56 |
| 5,317,834 | A | * | 6/1994 | Anderson | 47/48.5 |
| 5,556,229 | A | * | 9/1996 | Bishop et al. | 405/27 |
| 5,996,279 | A | * | 12/1999 | Zayeratabat | 47/48.5 |
| 6,695,544 | B2 | * | 2/2004 | Knudson et al. | 405/284 |
| 2001/0038804 | A1 | * | 11/2001 | Norton | 422/28 |
| 2002/0026747 | A1 | * | 3/2002 | Howe et al. | 47/48.5 |
| 2004/0139650 | A1 | * | 7/2004 | Haq | 47/48.5 |
| 2006/0163131 | A1 | * | 7/2006 | Kieselbach | 210/169 |
| 2007/0033869 | A1 | * | 2/2007 | Tsai | 47/48.5 |
| 2008/0005960 | A1 | * | 1/2008 | King | 47/48.5 |
| 2011/0056128 | A1 | * | 3/2011 | King | 47/48.5 |

FOREIGN PATENT DOCUMENTS

JP 63044817 A * 2/1988

OTHER PUBLICATIONS

Lemon Tree Creations, http://lemontreecreations.blogspot.com/2010_03_01_archive.html.*

* cited by examiner

*Primary Examiner* — Son T Nguyen
*Assistant Examiner* — Shadi Baniani
(74) *Attorney, Agent, or Firm* — Jerry Turner Sewell

(57) ABSTRACT

A root watering system for a tree or a shrub includes an outer container of a water-permeable, flexible material. A perforated, hollow inner support structure maintains the flexible material in an elongated shape between first and second ends. The outer container is positioned in the ground with the elongated shape proximate to the roots of the tree or shrub and with the first end proximate to the surface of the ground and with the second end near a lower end extending generally downward toward the lower portion of the root system of the tree or shrub. Water applied to the ground proximate the upper end of the outer container enters the first end and fills the outer container including the hollow inner support structure. Water within the outer container is released through the porous, flexible material to provide water to the root system of the tree or shrub.

12 Claims, 7 Drawing Sheets

DEEP ROOT WATERING SYSTEM

BACKGROUND OF THE INVENTION

1. Field of the Invention

The present invention is in the field of watering systems to provide water to the root systems of trees and shrubs.

2. Description of the Related Art

Water is essential to the growth of plants. Typically, plants are watered by applying water to a ground surface where plants are growing so that the water will seep into the soil where the root systems of the plants are located. Although surface watering is generally effective for grasses and other plants with shallow root systems, surface watering is not effective for trees and shrubs. In particular, in addition to supplying water, the root system of a tree or shrub also serves as a foundation or anchor for the tree or shrub. Thus, it is desirable for a tree or shrub to have a root system that extends to a much greater depth than for grasses and other shallow-rooted plants. The deeper root systems also allow a tree or shrub to obtain water that may exist at deeper levels even when the ground surface and the soil immediately below the surface are dry.

It has been found that frequent shallow watering of a tree or shrub tends to cause the tree or shrub to develop a root system near the surface rather than to develop a deep root system. In addition to not extending to a depth to provide support to the tree or shrub and to reach water existing at lower depths, the shallow root system tends to break through the ground surface. The shallow root system is aesthetically displeasing and subjects the roots to damage by yard equipment and other impacts.

A need thus exists for a watering system that provides water below the ground surface proximate to the root system of a tree or shrub.

SUMMARY OF THE INVENTION

A root watering system for a tree or a shrub includes an outer container of a water-permeable, flexible material. A perforated, hollow inner support structure maintains the flexible material in an elongated shape between first and second ends. The outer container is positioned in the ground with the elongated shape proximate to the roots of the tree or shrub and with the first end proximate to the surface of the ground and with the second end near a lower end extending generally downward toward the lower portion of the root system of the tree or shrub. Water applied to the ground proximate the upper end of the outer container enters the first end and fills the outer container including the hollow inner support structure. Water within the outer container is released through the porous, flexible material to provide water to the root system of the tree or shrub.

An aspect in accordance with certain embodiments of the present invention is a system that provides water to the roots of a tree or shrub. The system comprises a container having a flexible outer material that is permeable to water and that is generally impermeable to debris. The container has a cavity disposed between a first end and a second end. A plurality of support structures are enclosed within the cavity of the container. Each of the support structures comprises an inner cavity surrounded by an outer shell. The outer shell has a plurality of openings that enable free flow of water into and out of the inner cavity.

In certain embodiments of the system, the flexible outer material comprises high-tenacity monofilament polypropylene yarns woven into a stable network such that the yarns retain their relative positions. Preferably, the flexible outer material is formed into a cylindrical configuration having a tubular body portion and at least one generally disk-shaped end portion. In certain embodiments, the tubular body portion and the end portion are secured by polyester stitching.

In certain embodiments of the system, the support structures comprise plastic spheres. For example, each plastic sphere advantageously has size and shape corresponding to one of a softball, a baseball or a golf ball. Other sizes and shapes can also be used. In the illustrated embodiments, each plastic sphere has a hollow inner cavity and a thin outer shell. The thin outer shell is perforated by a plurality of holes to enable water to flow into and out of the inner cavity. In the illustrated embodiments, the plurality of support structures are positioned generally in a line extending from the first end to the second end of the container.

If desired a slow release fertilizer may be placed within the container.

Another aspect in accordance with certain embodiments of the present invention is a method for watering the roots of a tree or a shrub by positioning at least one water sock in soil proximate the root system of the tree or shrub. The water sock comprises a container having an outer cover of a flexible water permeable material formed into a hollow, generally cylindrical shape with an upper closed end forming a base of the cylindrical shape. The water sock further comprises a plurality of internal support structures positioned within the container between the upper closed end and a lower closed end. The internal support structures cause the outer cover to retain the generally cylindrical shape when the water sock is positioned in the ground and surrounded by the soil. Each support structure comprises a hollow inner cavity and a thin outer shell. The thin outer shell is perforated by a plurality of holes. The method further comprises applying water to an upper surface of the soil proximate to the tree or shrub. The water enters at least the upper closed end of the water sock and fills the container. The water enters the inner cavities of the internal support structures via the plurality of holes in each support structure. The method allows the water that fills the container to pass outward through the water permeable material of the outer cover into the surrounding soil to thereby water the roots of the tree or shrub at least to a depth corresponding to a length of the water sock between the first end and the second end.

In certain embodiments of the method for watering the roots of a tree or shrub, the flexible water permeable material comprises high-tenacity monofilament polypropylene yarns woven into a stable network such that the yarns retain their relative positions. Preferably, each internal support structure comprises a sphere having the size of one of a softball, a baseball or a golf ball. The method may also be used to apply fertilizer by including a slow release fertilizer with the container. The fertilizer is gradually dissolved in water that fills the container and is thereby distributed to the roots of the tree or shrub.

Another aspect in accordance with certain embodiments of the present invention is a method for constructing a water sock for watering the roots of a tree or a shrub. The water sock is constructed by forming a sheet of flexible water permeable material into a body having a hollow, generally cylindrical shape. A disk is also formed of the flexible water permeable material and is attached to one end of the body to form a closed base at a first end of the hollow, generally cylindrical shape. A second end of the body initially remains open. A plurality of internal support structures are positioned into the body through the open second end with the first internal support structure placed adjacent the closed base and with each succeeding internal support structure placed adjacent the preceding internal support structure. The number of internal support structures is selected to provide a selected overall length for the water sock. Each internal support structure comprises a thin outer shell surrounding an inner cavity. The thin outer shell has a plurality of holes that access the inner cavity. After the internal support structures are positioned in the body, the second end of the body proximate the last internal support structure positioned in the body is closed to confine the internal support structures within the body and to preclude the entry of material through the second end.

In certain embodiments in accordance with the method of constructing the water sock, the flexible water permeable material comprises high-tenacity monofilament polypropylene yarns woven into a stable network such that the yarns retain their relative positions. Preferably, the body is formed into the generally cylindrical shape by stitching with polyester thread, and the disk is attached to the body by stitching with polyester thread. In certain embodiments, the support structures comprise plastic spheres. In particularly preferred embodiments, each plastic sphere has a size and shape corresponding to one of a softball, a baseball or a golf ball; however, other sizes and shapes may also be used. If desired, a slow release fertilizer may be placed within the body before closing the second end.

BRIEF DESCRIPTION OF THE DRAWINGS

Embodiments in accordance with aspects of the present invention are described below in connection with the attached drawings in which.

DETAILED DESCRIPTION OF PREFERRED EMBODIMENTS

The root watering system is disclosed herein with respect to exemplary embodiments. The embodiments are disclosed for illustration of the root watering system and are not limiting except as defined in the appended claims.

Figure 1:
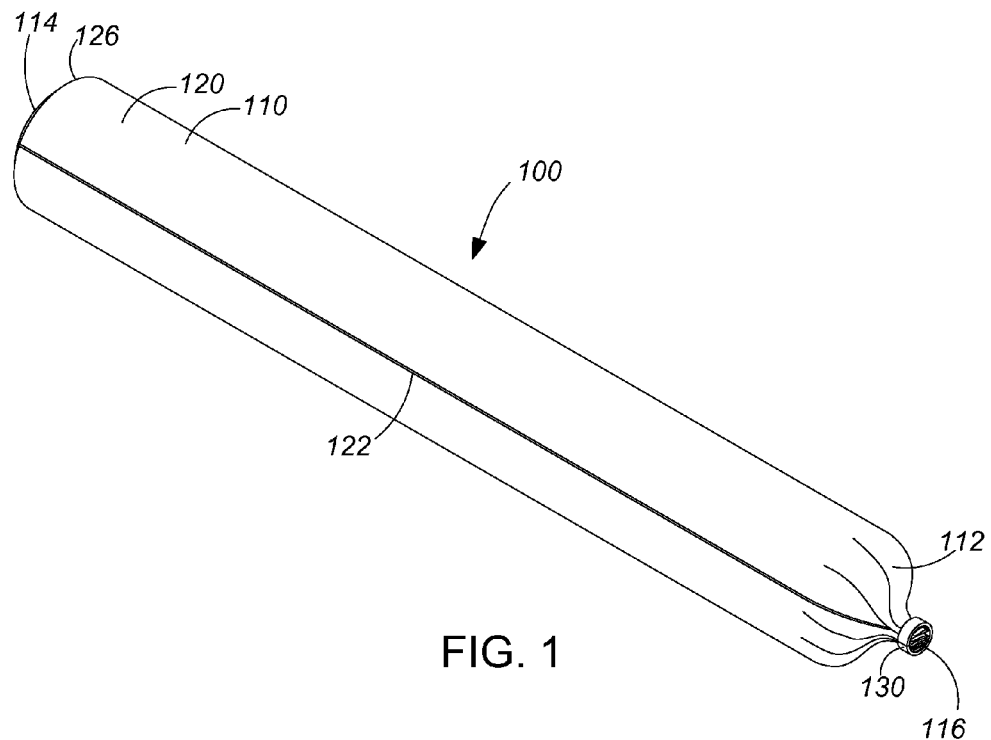
FIG. 1 is a perspective view of an embodiment of a water sock.
Figure 2:
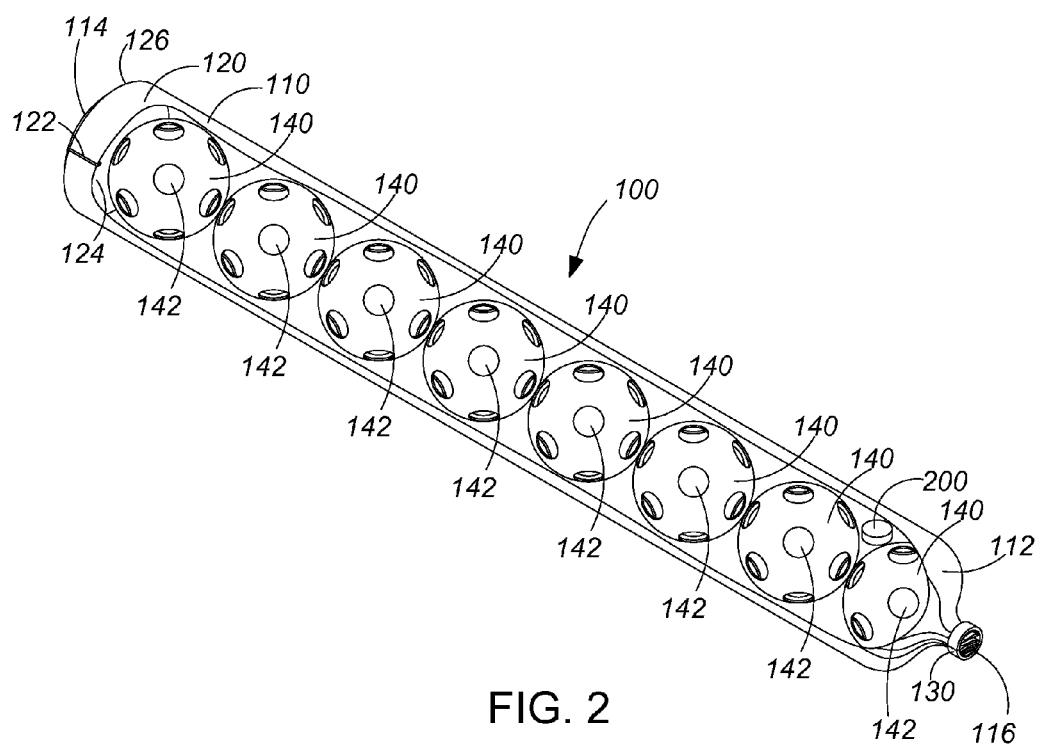
FIG. 2 is the perspective view of the water sock of FIG. 1 with a portion of the outer cover broken away to show the internal supporting structures enclosed within the outer cover.

FIGS. 1 and 2 illustrate an embodiment of a water sock 100. The water sock comprises an outer cover 110 that is generally formed as an elongated tubular body 112 having a first end 114 (referred to herein as the upper end) and a second end 116 (referred to herein as the lower end). The outer cover comprises a sturdy filtration material that allows water to seep through the covering but which prevents soil, insects and other unwanted material from passing through the covering. For example, in the illustrated embodiment, the outer cover comprises a geotextile material such as MIRAFI® 140N, which is commercially available from Ten Cate Geosynthetics North America, 365 South Holland Drive, Pendergrass, Ga. 30567. As described by the manufacturer, the geotextile material comprises high-tenacity monofilament polypropylene yarns that are woven into a stable network such that the yarns retain their relative positions. The geotextile is inert to biological degradation and resists naturally encountered chemicals, alkalis and acids. Similar materials from the same manufacturer or from other manufacturers may also be used.

As further shown in FIGS. 1 and 2, in the illustrated embodiment, the tubular body 112 of the outer cover 110 is formed from a generally rectangular sheet 120 of the geotextile material with the long edges attached (e.g., by sewing) along a longitudinal seam 122 to form a generally cylindrical shape. The upper end 114 comprises a generally circular sheet 124 (shown in FIG. 2) of the geotextile material having a diameter sufficiently larger than the diameter of the tubular body. The circular sheet is attached to the generally circular perimeter formed by a short edge of the geotextile material to close the tubular body along a circumferential seam 126. In the illustrated embodiment, the seams are formed by stitching the geotextile material with polyester thread or a similar long lasting thread. Preferably, the stitching or other attachment of the edges of the rectangular sheet and the attachment of the circular sheet to the circular perimeter are performed with the outer covering turned inside out. The outer covering is then inverted to the configuration shown in FIGS. 1 and 2 so that the two seams are on the inside. Thus, the stitches or other attachment is protected from abrasion. In the illustrated embodiment, the lower end 116 of the outer covering is closed with a suitable crimping device 130, such as, for example, a metallic band similar to the leg bands used to identify birds. Alternatively, a plastic tie wrap or similar device can be used to close the lower end 116 to provide a tight seal.

In FIG. 2, the tubular body 112 of the outer cover 110 of the water sock 100 is partially broken away to show a plurality of internal supporting structures 140, which are enclosed within the outer cover. In the illustrated embodiment, the internal supporting structures comprise hollow spheres, which preferably comprise polypropylene or other suitable plastic material formed as a thin outer shell with a relatively large inner cavity. The thin outer shell of each sphere is perforated with a plurality of holes 142 so that the inner cavity of the sphere is exposed.

In the illustrated embodiments, the perforated spherical shape of the internal supporting structures 140 is similar to the shape of conventional plastic training balls used in various sports. Such training balls can be used for the supporting structures; however, the aerodynamic characteristics of the internal supporting structures are not pertinent to the supporting function. Accordingly, the sizes, shapes and number of holes 142 may be selected to reduce the volume of the plastic material and thereby reduce the weight of the supporting structures. Preferably, the holes that perforate the spherical outer shell are distributed over the surface of the sphere so that the orientation of a supporting structure within the outer cover is not critical to the function of the water sock. In particular, a sufficient number of holes are included so that when the water sock is installed in the soil, as described below, at least one hole of each supporting structure is oriented generally downward regardless of the angular orientation of the supporting structure. Thus, as the water sock delivers water to the root system of tree or shrub, the internal supporting structures trap very little water within their respective cavities.

FIGS. 3A, 3B, 3C and 3D illustrate the steps of adding the internal supporting structures 140 to the water sock 100 of FIG. 1 and sealing the completed water sock. In FIGS. 3A-3D, the water sock is oriented such that the outer cover 110 is inverted with the closed first (upper) end 114 shown at the bottom and the second (lower) end 116 shown at the top. In each of FIGS. 3A-3D, the tubular body 112 of the outer cover is partially broken away to show the cavity formed by the tubular body.

Figures 3A, 3B, 3C, 3D:
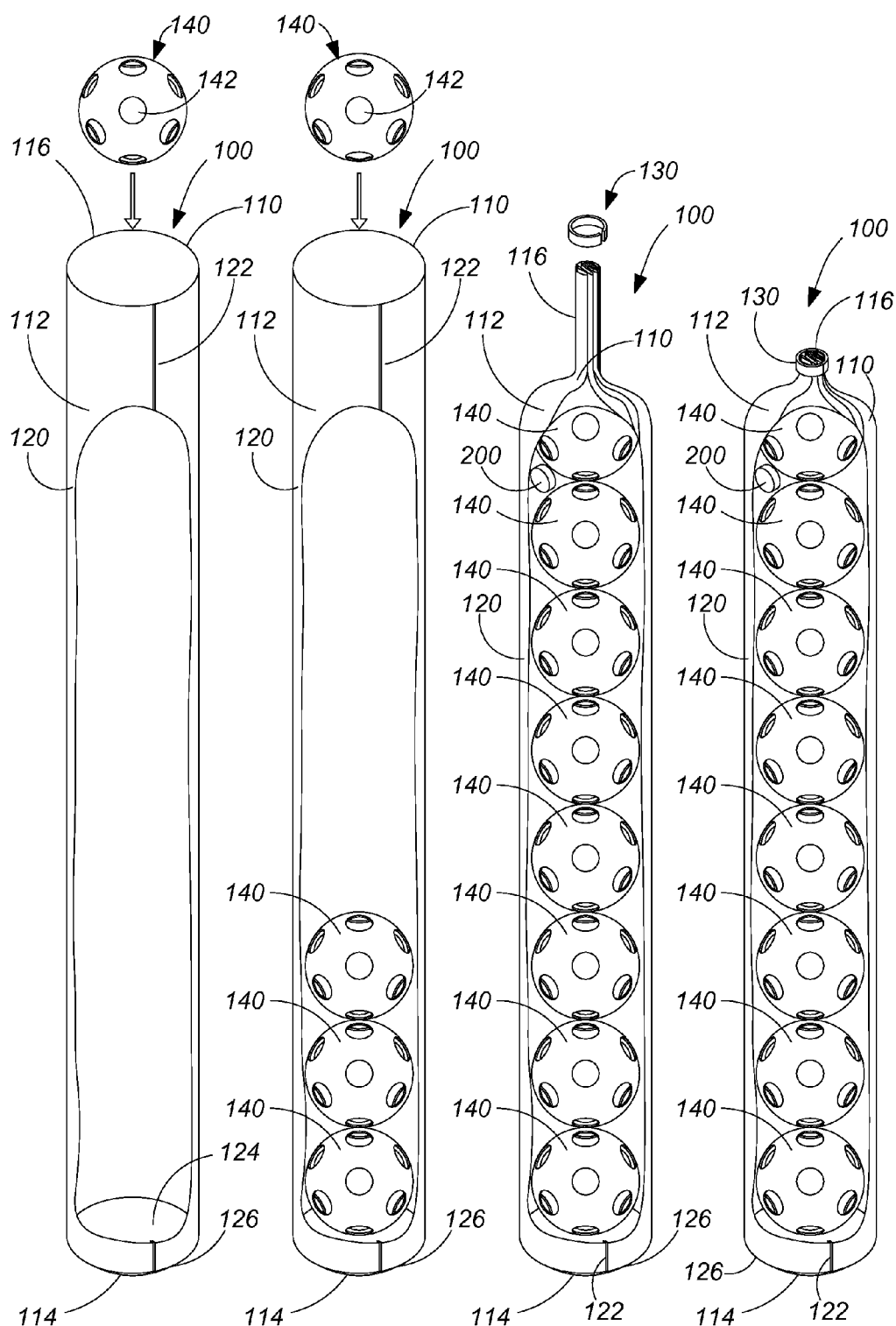
FIGS. 3A, 3B, 3C and 3D are perspective views of the water sock that illustrate the steps of adding the internal supporting structures to the water sock of FIG. 1 and sealing the completed water sock, wherein a portion of the outer cover is broken away to show the interior cavity of the water sock.

FIG. 3A illustrates the water sock 100 after the material of the tubular body 112 and the disk 124 are sewn or otherwise attached to create the outer cover 110 with the closed first end 114. In FIG. 3A, the second end 116 is open and is ready to receive the first internal supporting structure 140. In FIG. 3B, three of the internal supporting structures have been inserted into the water sock and a fourth supporting structure is being added. In FIG. 3C the water sock is filled with the desired number (e.g., 8) of the supporting structures, and the outer cover proximate to the second end is scrunched (e.g., folded or pleated) to reduce the cross-sectional area so that the crimping device 130 can be attached. As discussed above, one suitable crimping device is a generally circular metallic band such as a leg band used to identify a bird. Such leg bands are available, for example, from L&M Bird Leg Bands, Inc., of San Bernardino, Calif., and are available in different sizes. As shown in FIG. 3C, the crimping device is a split band, which is initially open so that the scrunched second end of the outer cover can be easily inserted. In FIG. 3D, the crimping device is secured to the scrunched material close to the uppermost (as viewed in FIGS. 3A-3D) supporting structure by applying pressure to close the open ends of the crimping device. For example, the pressure to close the band is advantageously applied using a pliers (not shown) adapted to close the gap in the band. Such pliers in sizes corresponding to the sizes of the leg bands are also available from L&M Bird Leg Bands, Inc. Preferably, excess material extending past the crimping device is removed (e.g., by cutting).

In certain embodiments of the water sock 100, prior to closing the second end 116, a fertilizer tablet 200 (shown in FIGS. 3C and 3D and in FIG. 2) is added to the interior along with the internal supporting structures 140. In particular, the fertilizer tablet is a slow release tablet that dissolves slowly over an extended period (e.g., many months) so that fertilizer is released into the soil proximate the root system of the plant when the water sock is installed as described below.

Figure 4A:
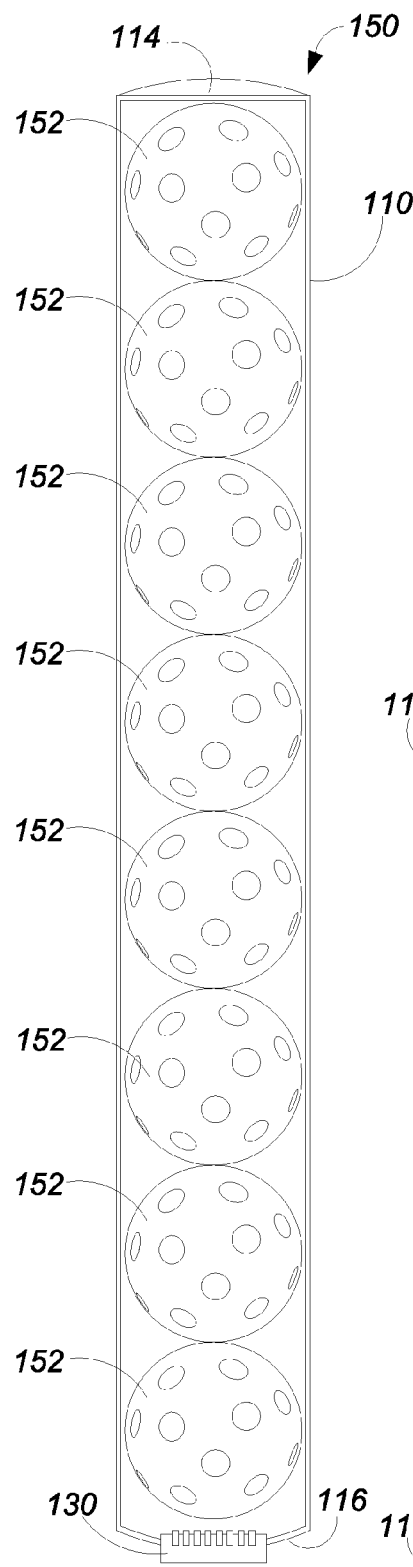
FIGS. 4A, 4B and 4C are cross-sectional view of three embodiments of the water sock having different sized outer covers and internal supporting structures.

The diameters of the supporting structures 140 and the diameter of the outer cover 110 are matched so that the supporting structures fit within the outer cover. For example, as shown in FIG. 4A, a first embodiment 150 of the water sock has internal supporting structures 152 with diameters similar to the diameter of a conventional softball (e.g., approximately 4.5 inches). The outer cover has a slightly larger inner diameter to accommodate the internal supporting structures. In the illustrated embodiment, the tubular body 112 has a length slightly larger than approximately 36 inches to accommodate the accumulative diameters of 8 internal supporting structures. The length of the tubular body and the number of internal supporting structures can be adjusted to create a water sock having a longer length or shorter length as desired. As described below, the larger first embodiment is suitable for use with a transplanted tree having a root ball with a depth of 2-3 feet. The first embodiment of the water sock has an internal volume of approximately 570 cubic inches, which is reduced by the relatively small volume displaced by the non-perforated portions of the outer shells of the internal supporting structures.

Figure 4B:
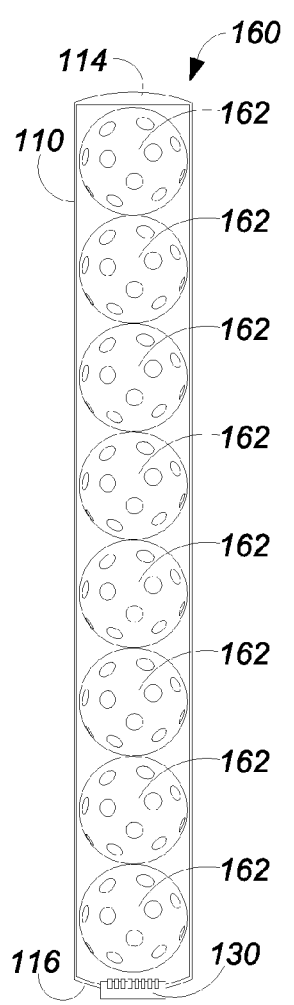

As shown in FIG. 4B, a second embodiment 160 of the water sock has internal supporting structures 162 with diameters similar to the diameter of a conventional baseball (e.g., approximately 2.75 inches). The outer cover 110 has a slightly larger inner diameter to accommodate the internal supporting structures. In the illustrated embodiment, the tubular body 112 of the second embodiment has a length slightly larger than approximately 22 inches to accommodate the accumulative diameters of 8 internal supporting structures. The length of the tubular body and the number of internal supporting structures can be adjusted to create a water sock having a longer length or shorter length as desired. As described below, the mid-sized second embodiment is suitable for use with smaller transplanted trees and larger shrubs having root balls less than approximately 2 feet in depth. In particular, the second embodiment of the water sock has an internal volume of approximately 130 cubic inches, which is reduced by the relatively small volume displaced by the non-perforated portions of the outer shells of the internal supporting structures.

Figure 4C:
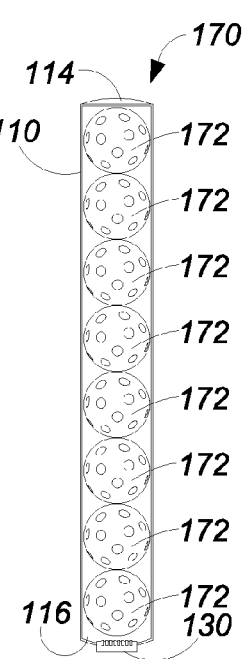

As shown in FIG. 4C, a third embodiment 170 of the water sock has internal supporting structures 172 with diameters similar to the diameter of a conventional golf ball (e.g., approximately 1.68 inches). The outer cover 110 has a slightly larger inner diameter to accommodate the internal supporting structures. In the illustrated embodiment, the tubular body 112 of the third embodiment has a length slightly larger than approximately 13.5 inches to accommodate the accumulative diameters of 8 internal supporting structures. The length of the tubular body and the number of internal supporting structures can be adjusted to create a water sock having a longer length or shorter length as desired. As described below, the small-sized third embodiment is suitable for use with small transplanted trees and shrubs having root balls approximately a foot in depth. In particular, the third embodiment of the water sock has an internal volume of approximately 30 cubic inches, which is reduced by the relatively small volume displaced by the non-perforated portions of the outer shells of the internal supporting structures.

Other sizes of water socks can be constructed using internal supporting structures with different diameters and supporting structures that have different shapes; however, the foregoing sizes of spheres are particularly advantageous because of the commercial availability of the perforated spherical balls widely used in sporting activities.

Figure 5:
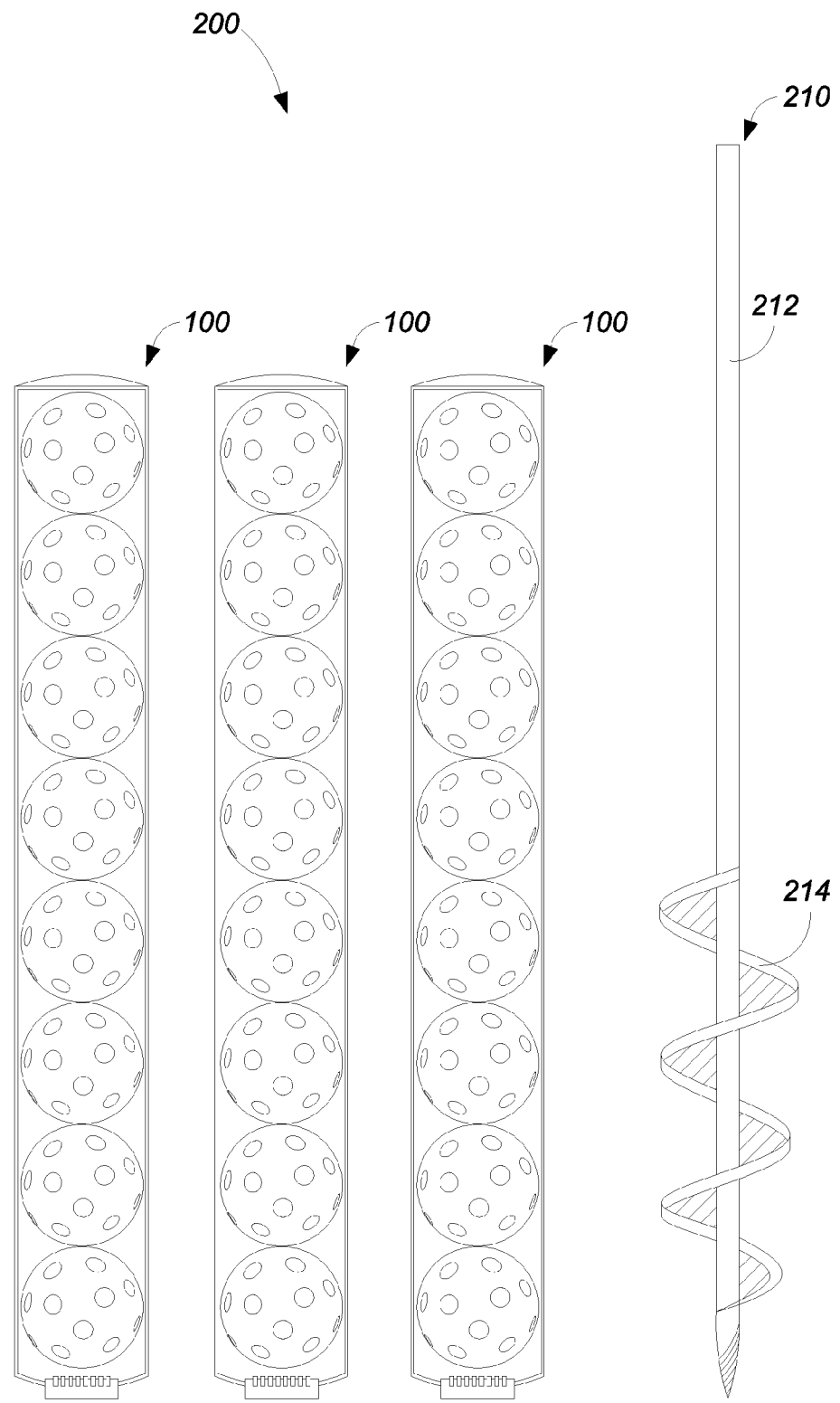
FIG. 5 illustrates an embodiment of a kit comprising a plurality of water socks and an auger for creating holes to enable the water socks to be inserted in the ground proximate a shrub or tree.

FIG. 5 illustrates an embodiment of a kit 200 comprising a plurality (e.g., 3 in the illustrated embodiment) of water socks 100 and an auger 210 for creating holes to enable the water socks to be inserted in the ground proximate a shrub or tree. The auger has a shaft 212 coupled to a helical cutting member 214 that is sized to create a bore hole in the soil that is slightly larger than a water sock. The water socks in the kit are sized in accordance with one of the embodiments described in FIG. 4A, FIG. 4B or FIG. 4C, respectively. For example, for a kit comprising the smaller water sock 170 of FIG. 4C having the golf ball sized internal supporting structures, the helical cutting member has a diameter of approximately 1.75 inches to 2 inches. The mid-sized water sock 160 of FIG. 4B can be positioned in a bore hole created by an auger having a cutting member with a diameter of approximately 3 inches. The larger water sock 150 of FIG. 4A can be positioned in a bore hole created by an auger having a cutting member with a diameter of approximately 4.75 inches to 5 inches. As discussed below, the auger is advantageously driven by a power drill or other rotational source.

Figure 6A:
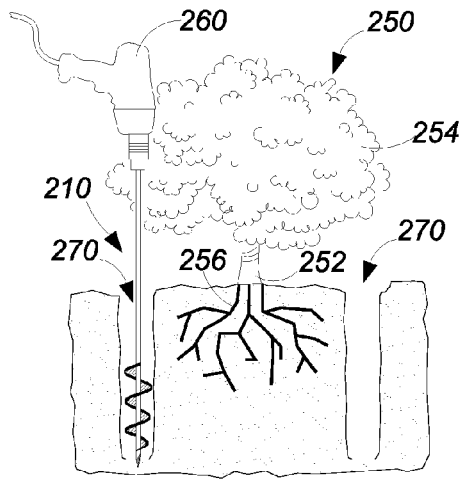
FIGS. 6A, 6B and 6C illustrate exemplary steps for installing the water socks in the kit of FIG. 5 proximate to an existing shrub or tree.
Figure 6B:
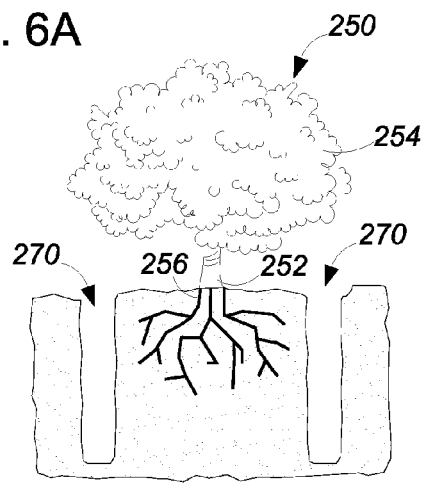
Figure 6C:
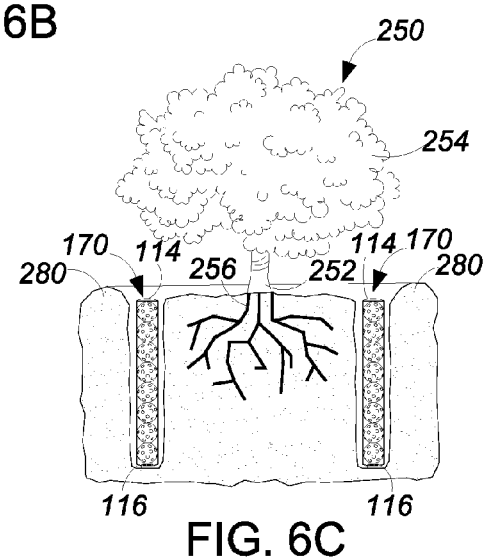

FIGS. 6A, 6B and 6C illustrate exemplary steps for installing the water socks 100 in the kit 200 of FIG. 5 proximate to an existing shrub or small tree 250. The existing shrub or small tree has a trunk 252 that supports foliage 254. The shrub or small tree is anchored to the soil via a root system 256. The auger 210 is coupled to a drill 260 or other source of rotating power and is positioned on the surface of the soil beneath the drip line of the tree or shrub as shown in FIG. 6A. The drill is operated to produce a generally vertical bore hole 270 that extends downward into the soil by a desired depth. For example, if only a single water sock 170 in accordance with the smallest embodiment is to be inserted, the depth of the bore is selected to be approximately 13.5 inches so that the when the second end 116 of the water sock is resting at the bottom of the bore hole, the first end 114 of the water sock is at the level of the original ground surface. The first end of the water sock may be slightly above or slightly below the ground surface and be effective for providing water to the root system of the tree or shrub. The bore hole may be extended or may be partially filled with soil to achieve the desired depth and resulting positioning of the first end of the water sock.

If the root system 256 of the tree or shrub 250 is particularly deep, the bore hole 270 may be bored to a depth sufficient to accommodate two water socks 170. The first water sock is inserted into the bore hole and the second water sock is positioned in the bore hole on top of the first water sock.

After creating a sufficient number of bore holes 270 for the number of water socks 170 to be installed, the water socks are inserted into the bore holes with the first (upper) ends 114 proximate the surface of the ground as shown in FIG. 6B. If the water socks are loose in the bore holes, dirt may be added around the outsides of the water socks.

As illustrated in FIG. 6C, after installing the water socks 170, a small berm 280 is created around the tree or shrub 250 outside the drip line so that the bore holes 270 with the water socks are within the boundaries of the berm.

The berm 280 forms a shallow pond around the base of the tree or shrub 250. When the tree or shrub is irrigated, the water collects in the pond and filters into the interiors of the water socks 170. Thus, when a sufficient amount of water is applied to fill the pond, an additional volume of water is stored in the water socks within the bore holes. This accomplishes a dual purpose. The added volume of the water socks increases the amount of water that can be applied during an irrigation cycle. The water socks also serve as conduits to deliver water to the lower levels of the root system 256 of the tree or shrub instead of relying on the water applied to the ground surface to filter through the soil. Thus, unlike conventional surface watering which may result in a shallow root system, the watering system utilizing the water socks causes the root system to develop at a greater depth, thus creating a stronger anchor for the tree or shrub and also causing the root system to be positioned to absorb water available at greater depths.

The structure of the water sock 100 is particularly advantageous for deep watering of the roots. Unlike pipes or other systems for applying water below the ground surface, which have exposed perforations that may clog up and become nonfunctional, the water sock has a continuous outer surface that allows the water to seep out of the interior of the water sock and into the surrounding soil. Furthermore, the cylindrical structure of the geotextile outer cover 110 of the water sock is maintained by the internal supporting structures 140, which prevent the water sock from collapsing from the pressure of the surrounding soil. The simple structure allows the water sock be manufactured easily and inexpensively from commercially available parts. The relatively thin shells of the internal support structures and the surrounding geotextile material allows the water sock to have a very light weight and yet be sufficiently rigid to allow the water sock to be easily inserted into a bore hole 270.

The water socks installed in the foregoing manner may include the slow-release fertilizer tablets 200 described above.

Figure 7A:
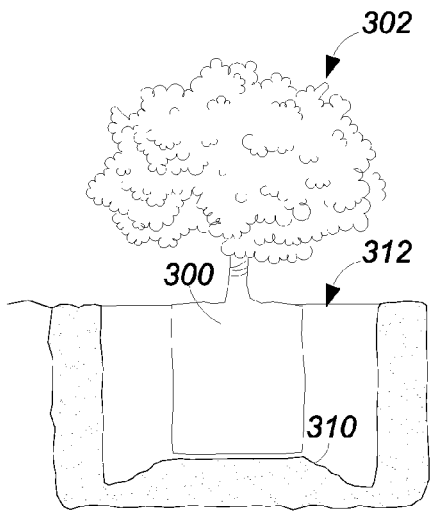
FIGS. 7A, 7B and 7C illustrate exemplary steps for installing the water socks when planting a new shrub or tree in an open planting pit.
Figure 7B:
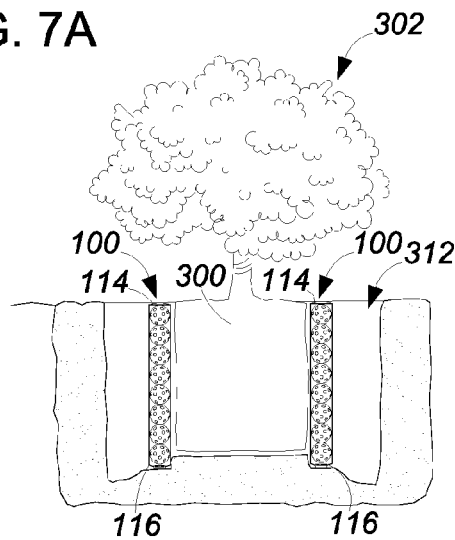
Figure 7C:
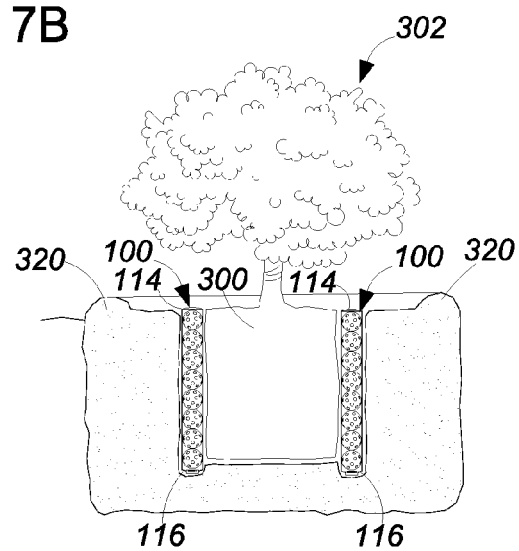

FIGS. 7A, 7B and 7C illustrate exemplary steps for installing the water socks when planting a new shrub or tree in an open hole. As illustrated in FIG. 7A, the root ball 300 of a tree or shrub 302 is positioned on a mound 310 of undisturbed original soil at the bottom of an excavated planting pit 312 in a conventional manner. As illustrated in FIG. 7B, a plurality of water socks 100 are positioned in the planting pit next to the root ball with the second (lower) ends 116 of the water socks positioned slightly below the lowest level of the root ball and with the first (upper) ends 114 of the water socks positioned proximate the original ground level surrounding the planting pit. The water socks are held in place while the planting pit is backfilled with soil as shown in FIG. 7C. As discussed above, a berm 320 is formed around the planting pit generally at the drip line of the tree or shrub. Although installed in a different manner, the water socks installed in accordance with FIGS. 7A-7C provide the same deep watering benefits as described above with respect to FIGS. 6A-6C. The water socks installed in the foregoing manner may include the slow-release fertilizer tablets 200 described above.

Figure 8:
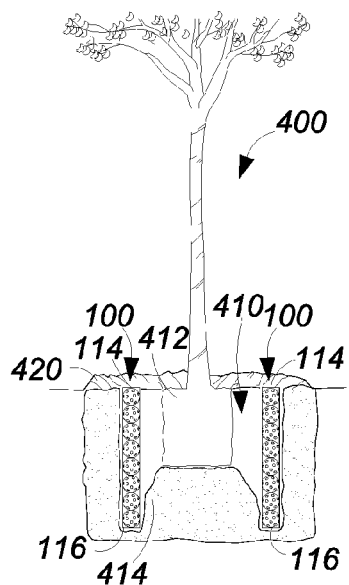
FIG. 8 illustrates the installation of a plurality of water socks proximate the root ball of a transplanted tree on generally level ground.

FIG. 8 illustrates the planting of a new tree 400 on relatively level ground. The tree is planted in a planting pit 410 with the root ball 412 of the tree resting on a mound 414 at the bottom of the planting pit. A plurality of the water socks 100 (preferably the larger water socks 150 of FIG. 4A) are positioned in the planting pit at the outer boundary of the pit with the respective second (lower) ends 116 of the water socks extended below the level of the root ball. The respective first (upper) ends 114 of the water socks are positioned approximately at the surface of the ground surrounding the planting pit. After positioning the water socks, the planting pit is backfilled (not shown) and a berm 420 is created around the tree so that the tops of the water socks are within the surface encircled by the berm.

The positions of the water socks 100 in the embodiment of FIG. 8 is advantageous because at least a portion of the water is delivered to soil that is spaced apart from the root ball and that is at a lower depth than the root ball. Accordingly, the root system of the new tree is encouraged to spread outwardly and downwardly to seek water.

Figure 9:
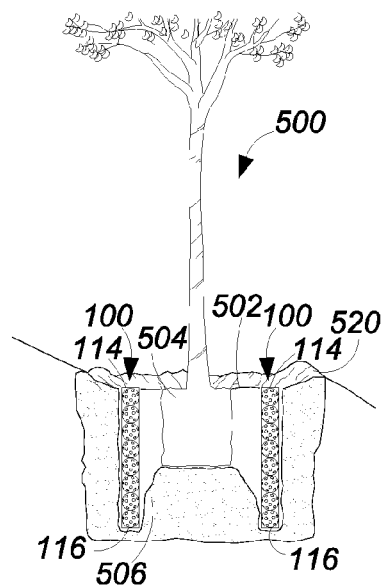
FIG. 9 illustrates the installation of a plurality of water socks proximate the root ball of a transplanted tree on sloping ground.

FIG. 9 illustrates the installation of a new tree 500 on sloped ground. A planting pit 502 is formed in a portion of the ground that is leveled to accommodate the planting pit. The root ball 504 of the tree rests on a mound 506 in the planting pit. A plurality of water socks 100 are positioned around the outer boundary of the planting pit and the planting pit is backfilled (not shown). A berm 520 is formed around the planting pit.

Figure 10:
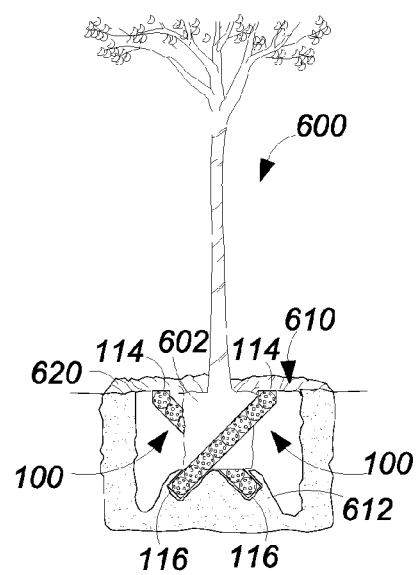
FIG. 10 illustrates the installation of a plurality of water socks proximate the root ball of a transplanted tree with the water socks at an angle (e.g., 45 degrees) with respect to perpendicular.

In certain installations of a new tree, the root ball may not be installed at a sufficient depth to accommodate the full length of a water sock. FIG. 10 illustrates the installation of a plurality of water socks 100 proximate to the root ball 602 of a transplanted tree 600 with the water socks positioned on a mound 612 in a planting pit 610 at an angle (e.g., approximately 45 degrees) with respect to perpendicular. The angled positions of the water socks provide the benefit of the full water storage and distribution capacity of the water sock while providing the water to the roots in the root ball from the surface down to the lowest level of the roots. The internal structure of the water sock allows the water sock to bend so that the water sock can form a downward spiral around the outer surface of the root ball or around the inner surface of the planting pit. As before, after installing the water socks and backfilling the planting pit, a berm 620 is created around the tree to encompass the tops of the water socks.

The water socks installed in accordance with FIG. 8, FIG. 9 or FIG. 10 may include the slow-release fertilizer tablets 200 described above.

The embodiments of the water sock described herein provide an economical, light weight, easy to install and long lasting system for providing water to the root systems of shrubs and trees. The materials used do not degrade significantly over many years of use. The water permeable geotextile material allows water to flow in and out of the water socks yet keeps soil, insects and other materials out of the water socks so that the water socks will remain free of debris and continue to transport water to the root systems for many years.

As various changes could be made in the above constructions without departing from the scope of the invention, it is intended that all the matter contained in the above description or shown in the accompanying drawings shall be interpreted as illustrative and not in a limiting sense.

What is claimed is:

1. A system that provides water to the roots of a tree or shrub, comprising:
   a container comprising a woven, geotextile outer material that is permeable to water and generally impermeable to debris, the outer material formed into a container having a cavity disposed between a first end and a second end; and
   a plurality of support structures enclosed within the cavity of the container, each of the support structures comprising an inner cavity surrounded by an outer shell, the outer shell having a plurality of openings that enable free flow of water into and out of the inner cavity, the plurality of support structures positioned in a single line from the first end of the container to the second end of the container, the plurality of support structures positioned with each support structure adjacent to and in contact with at least one other support structure to form a continuous internal framework that supports the woven, flexible outer material of the container in a generally tubular configuration.

2. The system as defined in claim 1, wherein the woven, geotextile outer material comprises high-tenacity monofilament polypropylene yarns woven into a stable network such that the yarns retain their relative positions.

3. The system as defined in claim 2, wherein the woven, geotextile outer material is formed into a cylindrical configuration having a tubular body portion and at least one generally disk-shaped end portion.

4. The system as defined in claim 3, wherein the tubular body portion and the end portion are secured by polyester stitching.

5. The system as defined in claim 1, wherein the support structures comprise plastic spheres.

6. The system as defined in claim 5, wherein each plastic sphere has a size and shape corresponding to one of a softball, a baseball or a golf ball.

7. The system as defined in claim 5, wherein each plastic sphere has a hollow inner cavity and a thin outer shell, and wherein the thin outer shell is perforated by a plurality of holes to enable water to flow into and out of the inner cavity.

8. The system as defined in claim 1, further including a slow release fertilizer placed within the container.

9. A method for watering the roots of a tree or a shrub, comprising:
   positioning at least one water sock in soil proximate the root system of the tree or shrub, the water sock comprising a container having a woven geotextile outer material that is permeable to water and generally impermeable to debris, the outer material formed into a container having a cavity disposed between a first end and a second end; and
   a plurality of support structures enclosed within the cavity of the container, each of the support structures comprising an inner cavity surrounded by an outer shell, the outer shell having a plurality of openings that enable free flow of water into and out of the inner cavity, the plurality of support structures positioned in a single line from the first end of the container to the second end of the container, the plurality of support structures positioned with each support structure adjacent to and in contact with at least one other support structure to form a continuous internal framework that supports the woven, flexible outer material of the container in a generally tubular configuration; applying water to an upper surface of the soil proximate to the tree or shrub, the water entering at least the upper closed end of the water sock and filling the container, the water entering the inner cavities of the plurality of support structures via the plurality of openings in each support structure; and allowing the water that fills the container to pass outward through the woven, geotextile outer material of the outer cover into the surrounding soil to thereby water the roots of the tree or shrub at least to a depth corresponding to a length of the water sock between the first end and the second end.

10. The method as defined in claim 9, wherein the woven, geotextile outer material comprises high-tenacity monofilament polypropylene yarns woven into a stable network such that the yarns retain their relative positions.

11. The method as defined in claim 9, wherein each support structure comprises a sphere having the size of one of a softball, a baseball or a golf ball.

12. The method as defined in claim 9, wherein the container includes a slow release fertilizer that is gradually dissolved in water that fills the container and is thereby distributed to the roots of the tree or shrub.

* * * * *